US009964235B2

(12) United States Patent
Gomes Fernandes

(10) Patent No.: US 9,964,235 B2
(45) Date of Patent: May 8, 2018

(54) SUPPORTING STRUCTURES FOR PIPELINES AND THE LIKE

(71) Applicant: Paulo Roberto Gomes Fernandes, Rio de Janeiro (BR)

(72) Inventor: Paulo Roberto Gomes Fernandes, Rio de Janeiro (BR)

( * ) Notice: Subject to any disclaimer, the term of this patent is extended or adjusted under 35 U.S.C. 154(b) by 0 days. days.

(21) Appl. No.: 15/208,294

(22) Filed: Jul. 12, 2016

(65) Prior Publication Data
US 2016/0341340 A1 Nov. 24, 2016

Related U.S. Application Data

(63) Continuation-in-part of application No. 13/321,210, filed as application No. PCT/BR2010/000155 on May 14, 2010.

(30) Foreign Application Priority Data

May 20, 2009 (BR) ...................................... 0904280

(51) Int. Cl.
*F16L 3/22* (2006.01)
*F16L 3/26* (2006.01)
*F16L 7/00* (2006.01)

(52) U.S. Cl.
CPC ................. *F16L 3/221* (2013.01); *F16L 3/26* (2013.01); *F16L 7/00* (2013.01)

(58) Field of Classification Search
CPC ... F16L 55/26; F16L 3/221; F16L 7/00; F16L 3/26; E21F 17/02

(Continued)

(56) References Cited

U.S. PATENT DOCUMENTS 1,354,920 A * 10/1920 Seiler ................... B65D 88/744
248/49
1,452,497 A * 4/1923 Fischer ..................... F16L 3/00
248/49

(Continued)

FOREIGN PATENT DOCUMENTS

BR    PI-7705678-7       5/1978
BR    PI-9801566-4 A     9/1999

(Continued)

OTHER PUBLICATIONS www.davicorpipelinerollers.com, http://web.archive.org/web/20070907 192648/http://www.davcorpipelinerollers.com/Overview/overview.html. Sep. 2007.

(Continued)

*Primary Examiner* — Muhammad Ijaz
(74) *Attorney, Agent, or Firm* — Pearne & Gordon LLP

(57) ABSTRACT

The present invention is related to curved structural support elements installed within a tunnel to provide support to pipelines and the like. They comprise elongated and short curved structural support elements directly fastened to the generally concave inner walls of the tunnel wherein the back surface of said curved structural support elements contacts and substantially follows the geometrical contour of the generally concave inner walls. The elongated and short structural support elements are provided with means to firmly receive and connect to at least one pipeline support element thereto thereby providing support for a pipeline or the like. By using both the elongated and the short curved structural support elements to provide support for pipelines and the like no traction stresses are transferred to the walls of the tunnel.

12 Claims, 12 Drawing Sheets

(58) Field of Classification Search
 USPC .................................. 248/49, 53; 228/212
 See application file for complete search history.

(56) References Cited

U.S. PATENT DOCUMENTS

| | | | | |
|---|---|---|---|---|
| 1,703,605 A | * | 2/1929 | Ballantyne | F16L 3/18 138/106 |
| 1,817,798 A | * | 8/1931 | Barr | F16L 3/18 248/55 |
| 1,846,550 A | * | 2/1932 | Gottwald | F16L 3/18 138/106 |
| 1,922,913 A | | 8/1933 | Free et al. | |
| 1,995,716 A | * | 3/1935 | Millsom | F16L 3/18 138/105 |
| 2,005,699 A | * | 6/1935 | Gottwald | F16L 7/00 138/106 |
| 2,991,807 A | * | 7/1961 | Turner | F16L 3/18 138/108 |
| 3,241,224 A | | 3/1966 | Banister et al. | |
| 3,374,308 A | * | 3/1968 | Haas | F16L 7/00 138/113 |
| 3,644,695 A | | 2/1972 | Shuey et al. | |
| 3,720,069 A | | 3/1973 | Lockridge et al. | |
| 3,744,259 A | | 7/1973 | Wagley | |
| 3,882,299 A | | 5/1975 | Sciaky | |
| 3,900,146 A | | 8/1975 | Fowler | |
| 4,130,925 A | | 12/1978 | Gibson | |
| 4,196,942 A | * | 4/1980 | Calmes | B21B 17/08 384/38 |
| 4,286,137 A | | 8/1981 | Thome | |
| 4,378,086 A | | 3/1983 | Wascat | |
| 4,486,123 A | | 12/1984 | Koch et al. | |
| 4,605,151 A | | 8/1986 | Brown | |
| 4,765,776 A | | 8/1988 | Howson | |
| 4,780,025 A | * | 10/1988 | Oberholzer | G02B 6/4459 248/74.1 |
| 4,907,732 A | | 3/1990 | Jones | |
| 4,910,374 A | | 3/1990 | Lebedev et al. | |
| 5,044,825 A | | 9/1991 | Kaldenbach | |
| 5,364,013 A | | 11/1994 | Scheuerman | |
| 5,482,404 A | | 1/1996 | Tenbusch, II | |
| 6,262,403 B1 | | 7/2001 | Tsuchiya et al. | |
| 6,364,011 B1 | | 4/2002 | Bergeron | |
| 6,671,953 B2 | | 1/2004 | McAninch et al. | |
| 7,161,115 B2 | | 1/2007 | Stecher et al. | |
| 7,765,685 B2 | | 8/2010 | Brown | |
| 8,162,201 B2 | * | 4/2012 | Gomes Fernandes | F16L 1/038 219/59.1 |
| 2002/0088906 A1 | * | 7/2002 | Nothofer | G02B 6/508 248/65 |
| 2003/0039509 A1 | | 2/2003 | McIvor | |
| 2006/0110219 A1 | | 5/2006 | Puttmann | |
| 2007/0221385 A1 | | 9/2007 | Braun et al. | |
| 2010/0287957 A1 | | 11/2010 | Liu | |
| 2011/0030942 A1 | | 2/2011 | Orgeron | |

FOREIGN PATENT DOCUMENTS

| | | |
|---|---|---|
| BR | MU 8600496-4 U | 9/2006 |
| BR | PI-0622437-7 | 9/2006 |
| BR | PI-0800385-8 A2 | 10/2009 |
| EP | 0877186 A1 | 11/1998 |
| GB | 1585764 | 3/1981 |
| JP | 10002191 A | 1/1998 |
| RU | 2079761 C1 | 5/1997 |
| WO | 03-036153 A1 | 5/2003 |
| WO | 2009109021 A1 | 9/2009 |

OTHER PUBLICATIONS www.pipelineroller.com, http://web.archive.org/web/20071010081823/http://pipelineroller.com/single_double.html, Oct. 2007.

\* cited by examiner

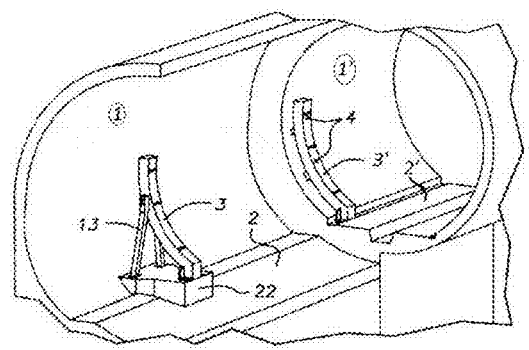
FIG. 4
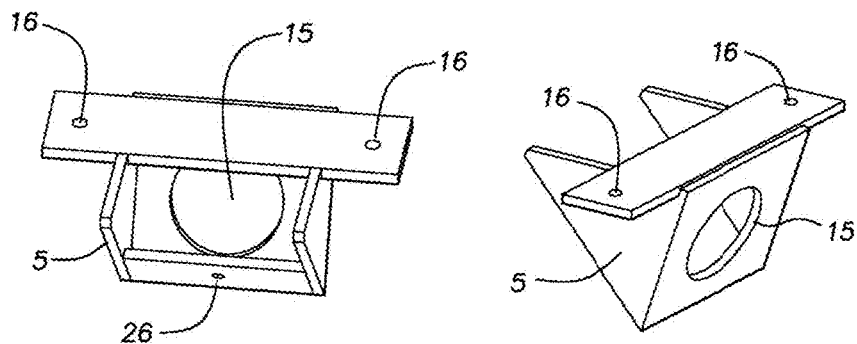
FIG. 5A   FIG. 5B
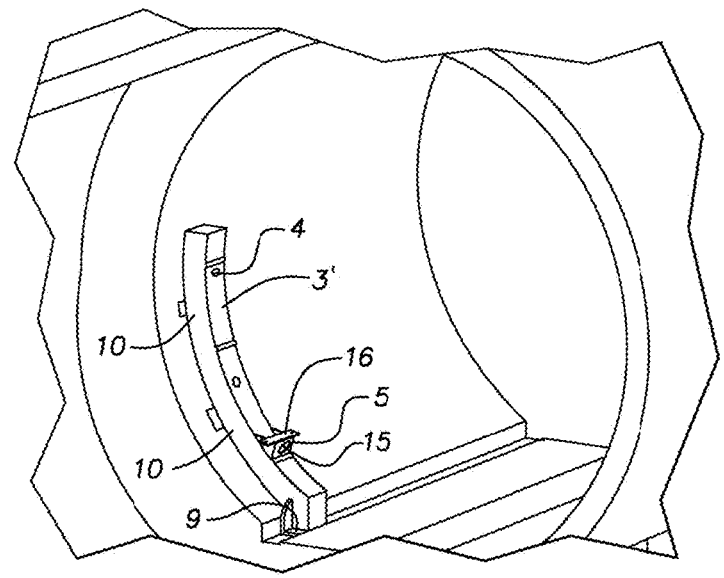
FIG. 6

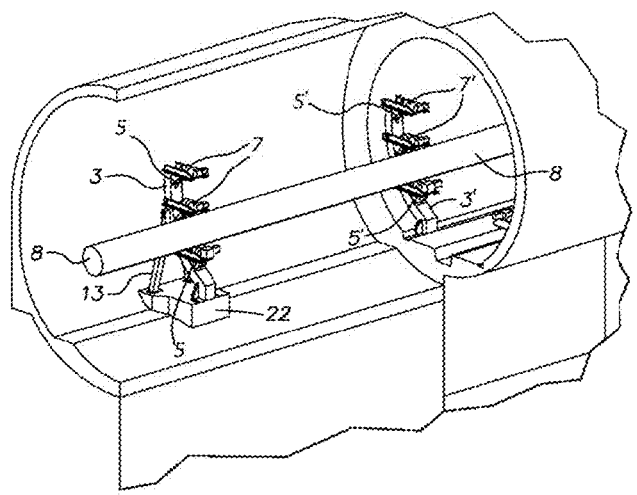
FIG. 10
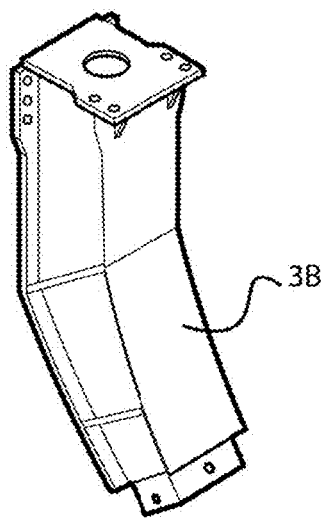
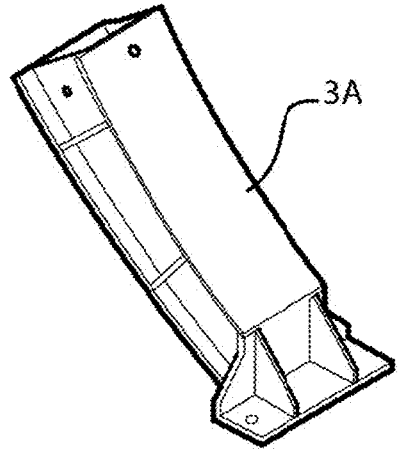
FIG. 11A  FIG. 11B

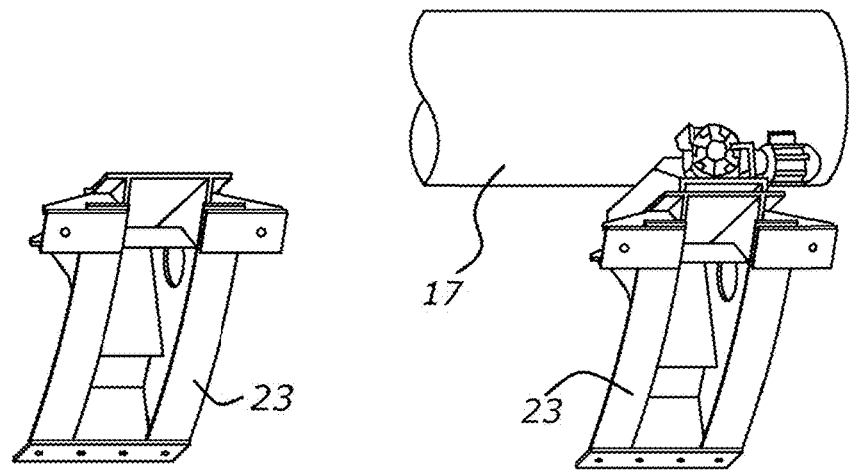
FIG. 15  FIG. 16
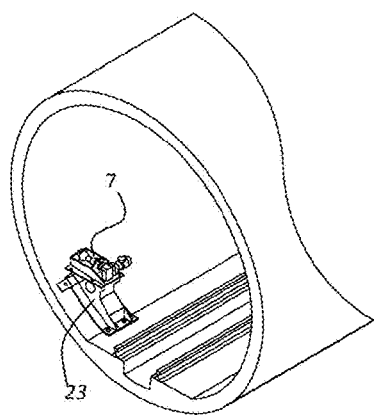
FIG. 17
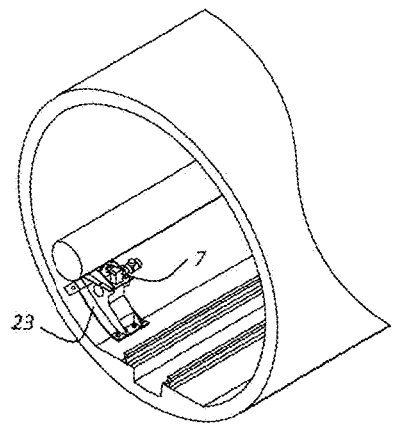
FIG. 18

SUPPORTING STRUCTURES FOR PIPELINES AND THE LIKE

FIELD OF THE INVENTION

The present invention relates to supporting structures intended to provide structural support of pipelines and the like installed inside tunnels having side inner walls substantially concave.

RELATED ART

The need to carry substantial volumes of fluid to sites located at great distances, such as water, oil and oil products, chemicals, etc., led to the need to build large stretches of pipelines, through which such fluids can be easily transported.

These pipelines are often installed in ditches dug in the soil, which normally are then covered with the material that was previously removed to dig the ditch when completing the installation of pipeline segments in these ditches.

However, in some situations there are landforms such as hills and mounts, for example, in the path where the pipe should be installed. There may also be urban areas and rock formations in the way of the pipeline, which would hinder the installation process by the traditional method of digging ditches in which to install the pipeline, and then covering it later with the material that was previously removed for the excavation of the ditch.

In such cases, tunnels are usually constructed which allow the direct passage of the pipeline through such landforms or urban areas. A number of well-known techniques exist for tunnel construction.

One such technique is cut and cover tunneling (CCT), which is more appropriate for constructing shallow tunnels. An advantage of this technique provides the possibility of easily excavating tunnels having non-uniform shapes. However, this technique is not feasible when it is not possible to excavate tunnels which have to pass through landforms (hills, mounts, etc.) or densely populated urban areas.

Since the need for pipelines to pass through landforms or densely populated urban areas is common, the CCT technique is not useful for excavating tunnels for the passage of pipelines through these areas.

A further technique for excavating tunnels is the drill and blast method (DBM), which involves the use of explosives. Jumbo drills are used to drill blast holes on the proposed tunnel surface to a designated depth, and explosives are placed in the holes for blasting and braking rocks for excavation.

Next, the blasted material (rocks and soil) is transported out of the tunnel before further blasting. Since the composition of the soil formation may vary from hard rock to soft ground, adequate structural means are required when using this method of tunneling.

Another excavation technique is the Sequential Excavation Method, also known as the New Austrian Tunneling Method (NATM). In this method, the excavation is first divided into segments, which are then mined sequentially with supports.

To excavate the tunnel using the NATM it is necessary to monitor the behavior of the soil formation under load and the performance of the excavation of the tunnel during construction in order to build the structural support of each section of the tunnel.

Tunnels built through the CCT and NATM techniques usually have large and uneven walls due to the characteristics of the excavation process which do not allow the construction of regular walls. Consequently, the cross section of these tunnels is usually irregular.

A common feature of DBM and NATM is the use of heavy mining equipment (back actors, header machines, hydraulic cutters, jumbo drills, etc.) which are commonly used for the tunnel excavation. In addition, it is necessary to use heavy trucks inside the tunnel to remove the excavated material and to transport the equipment needed for other regular tunnel excavation operations.

This makes it necessary for the floor of these tunnels to be substantially flat in order to facilitate the movement of such equipment and materials. As a general rule, the transverse dimensions of the floor are substantially equivalent to the maximum horizontal dimensions of the tunnel.

In tunnels excavated using these conventional techniques which employ blasting and digging with heavy equipment, the application of support layers and lining occurs in successive steps, generally employing various materials in these steps such as shotcrete, steel rods, wire mesh and molded concrete.

In the cases where tunnels are constructed by these techniques to allow for the passage of pipelines inside of them, it becomes necessary to build a system for support of the pipelines. Usually, these support elements are fixed on the walls, the ceiling or in the tunnel floor, which do not present problems to withstand the stresses which arise from the weight of the pipeline being supported.

A more recent technique for tunneling is rotary excavation, which employs drilling equipment known by the acronym TBM (Tunnel Boring Machine), comprising a rotating cutter wheel or cutter head at the front followed by trailing support mechanical and electrical equipment. Disc cutters and a scraping mechanism loosen the material to bore the tunnel, and the excavated material is moved to the back of the TBM and next out of the tunnel.

Once the TBM has moved a sufficient distance, structural precast interlocked concrete lining elements are installed by means of dedicated equipment located at the back of the TBM in order to recover the recently bored part of the tunnel, providing quick substitution of the excavated material for a ready tunnel. These precast interlocked concrete lining elements form the lining of the tunnel.

Usually the cross shape of tunnels excavated by the TBM method is circular, but there are some other possibilities of cross section shapes, such as elliptical or egg-shaped.

Whatever is the cross section shape of a tunnel excavated by the TBM method this technique enables the excavation of a tunnel providing high strength in resisting the load by means of substantially concave walls action, good sealing ability and waterproofness. Further, it allows rapid tunneling of a cross-section of smaller diameter, which is not an easy task to be performed by drilling and blasting excavation techniques.

The technique of tunnel excavation by the TBM method has become widely employed in the digging of tunnels for the passage of pipelines and cables, mainly because it is usually not necessary for such tunnels to have large dimensions.

However, the use of tunnels of smaller dimensions excavated by means of the TBM method to allow the passage of pipelines and/or cables causes a problem that is not observed in tunnels excavated by traditional methods, such as those excavated by controlled blasting technique.

As mentioned above, the latter are provided with a substantially level floor and large dimensions, which facilitates the mobility of transportation equipment, and assembly of the support elements of the pipelines and/or cables, also enabling these support elements to be fixed on the floor and/or walls of the tunnel.

However, in tunnels of smaller dimensions excavated by the TBM method, this possibility is much more restricted. Since the cross section in these tunnels is circular, elliptical or egg-shaped, it becomes more difficult to fix the support elements for pipelines and/or cables, because in this case there is no substantially flat floor to facilitate this task.

Moreover, if the building of a floor for the tunnel is provided, such action would substantially increase the cost of the tunnel construction, and also would reduce the useful height for the installation of the support elements of the pipelines and/or cables, which is undesirable.

Another drawback observed in tunnels excavated by the TBM method is that the substantially concave inner walls of the tunnel cannot receive traction stress, which, if occurs, may compromise tunnel stability.

Thus, support elements that cause traction stress to increase at the points where they are fixed to the substantially concave inner tunnel walls, excavated by the TBM method, must be avoided so as not to cause forces that could compromise the tunnel structure and, over time, could even cause collapse.

This creates a major drawback for the use of support elements regularly employed in tunnels excavated by conventional methods, because they are designed without the need to avoid traction stresses from occurring on the tunnel walls at the points where they are fixed to them.

To avoid this problem, the fastening elements of those support elements which cause traction stresses in the walls of the tunnel have to be anchored deeply into the outer region of the tunnel behind the precast interlocked concrete lining elements. In other words, they would be anchored in soil or rock external to the tunnel.

This would cause various problems. It would be necessary for the tunnel inner walls to be perforated in several places along its entire length so that the fastening elements of the conventional support elements of the pipelines could pass through these perforations in the walls.

Further, these perforations should necessarily have significant longitudinal dimensions, because besides being necessary to overcome the thickness of the walls, it would still be necessary to proceed with drilling for a substantial length beyond the walls, so as to provide a firm anchorage for these fasteners.

This operation, as well as being time consuming, is also difficult to perform in smaller tunnels due to difficulties in moving through the tunnel and operating a deep drilling rig, with significant dimensions and significantly higher weight.

Another drawback is that, when drilling the tunnel walls to provide means to firmly anchor the fasteners, the walls lose the characteristic of sealing and waterproofing. Since there may be situations where there are aquifers along the path of the tunnel, in these cases, there is the risk that water may enter the tunnel during construction.

The main reason for the above described drawbacks is that, in tunnels excavated by the TBM method, it have been used the same techniques of support for pipelines and/or cables commonly used in tunnels excavated using traditional techniques described heretofore. As mentioned earlier, the latter does not have the sizing limitations observed in tunnels excavated by the TBM method.

Moreover, when used in tunnels excavated by the TBM method, these traditional support techniques of pipelines and/or cables would also cause difficulties for the installation of new pipelines.

This difficulty stems from the fact that the support elements that are used in these techniques usually occupy much of the usable space of the tunnels excavated by the TBM method. This greatly limits the ability to install new pipelines in the tunnel, or may even prevent installation from being done, thereby creating the need to excavate a new tunnel. For example, there may be situations where the available space does not allow the installation of a pipeline of larger diameter, due to poor use of existing space.

If steel columns or I-beams are employed in the construction, this causes confinement of the pipeline in 'squares sections,' causing difficult access to the pipeline for inspections, maintenance and painting, and even replacements. The use of I-beams requires the provision of overhead crossbeams, as well as the installation of structural pieces requiring local adjustment, which reduces the space allowance for the circulation of vehicles and personnel.

Furthermore, it is sometimes necessary to conduct maintenance interventions on the pipelines and/or the support system requiring the use of booms or other similar equipment; however such intervention is frequently not possible with this equipment due to the reduced useful height caused by the I-beams and overhead crossbeams.

Thus, it is observed that the need exists to provide pipeline support elements which can be used in tunnels excavated by the TBM method which do not cause the onset of traction stresses in the walls of the tunnel, and which do not cause difficulties for the installation of new pipelines and/or cables, allowing substantially better utilization of the internal space of the tunnel for this purpose.

The present invention addresses the all the above mentioned drawbacks, as it would be seen in the detailed description of the invention which will be provided later.

BACKGROUND OF THE INVENTION

In order to address the drawbacks observed when conventional means of support for a pipeline are used in a tunnel having generally concave inner walls, such as those excavated by the TBM method, as mentioned heretofore, inventive equipment was developed for support of pipelines, said equipment comprising a curved structural support element installed within the tunnel, and directly fastened to the generally concave inner walls thereof, whose back surface contacts and substantially follows the geometrical contour of the inner walls of the tunnel.

The curved structural support element is provided with means to firmly receive and connect to at least one pipeline support element thereto.

In the case where it is necessary to install new pipelines passing through the tunnel in the future, it suffices to firmly connect new pipeline support elements to the existing curved structural support elements, so as to provide a support structure for said new pipelines.

The curved structural support element may be modularized, so that initially, only inferior modules are assembled within the tunnel, directly fastened to the walls thereof, able to receive at least one pipeline support element.

In the advent that it is necessary to pass a new pipeline through the tunnel, it suffices to assemble additional superior modules to each of the existing inferior modules of the curved structural support elements, thereby enabling the additional pipeline support elements to be firmly fixed thereto, to support said new pipeline.

Said inferior modules and superior modules of the curved structural support elements are provided with fastening means which firmly connect each other.

The present invention obviates the use of steel columns and overhead crossbeams to provide support means for pipelines passing through tunnels, thereby eliminating confinement of the pipeline in squares sections, and enabling free access for inspections, maintenance interventions and even replacement of segments of pipeline.

Further, since steel columns and overhead crossbeams are not used, this maximizes the space for the circulation of vehicles and personnel.

Another advantage of the present invention over the prior art resides in the fact that there is a reduced number of structural interfaces between the curved structural support elements and the tunnel walls, thereby reducing the possibility of assembling errors from occurring, as well as the need for local adjustments, which evidently reduces the time for assembling the whole pipeline support system.

The structural design of pipeline support of the invention is inspired by avionic structures, more specifically the fuselage, and is designed to withstand large amounts of load and stress, thereby obviating any supersizing of the project.

Therefore, the structural design was developed in such a way that mechanical stresses within the structure are substantially balanced, and only compressing stresses are transferred to the walls of the tunnel, favoring the structural integrity of the walls. No traction stresses are transferred to the walls of the tunnel, which, if occurred, could cause them to collapse.

Consequently, a pipeline support system is provided that does not rely on the capacity of the tunnel walls to fasten the pipeline support system, meaning that there is no need for said walls to resist traction stresses.

Furthermore, the use of curved structural support elements of the present invention provided by the pipeline support elements obviate the need for the use of heavy concrete plinths (bases) like the ones used to support steel columns of conventional pipeline support means. This suffices to provide, when necessary, a light base to secure the curved structural support elements.

Additionally, the maximization of tunnel space provided by the use of the curved structural support elements of the present invention enables the installation of a removable cargo-boom which aids assembling and maintenance operations.

The present invention may be used in a complementary and non-exclusive manner together with the structural means for laying of pipelines as described in the patent U.S. Pat. No. 8,162,201, granted on 24 Apr. 2012, preferably making use of motorized driving rollers or idle rollers, as described in Brazilian patent PI 0622437-7, filed on 20 Mar. 2006 and granted on 10 Feb. 2016. The contents of these patents are incorporated herein for reference.

In view of the foregoing, and in combination with the abovementioned patent, the present invention addresses a number of problems observed in the operations needed for laying pipelines, such as:

- eliminates the need for any type of welding within the tunnel for the physical assembly of the pipeline support structures, by using structures that are prefabricated and installed within the tunnel with the use of fastening means;
- allows the assembly of a new pipeline support system to be performed only when needed, thereby reducing costs, as the costs for the installation of any further pipeline support systems will not be considered in the budget of the pipeline support system which is being installed;
- eliminates the drawbacks observed in support structures that make use of steel columns (I-beams), precluding the confinement of pipelines within 'squares sections' which cause difficulties for inspection and maintenance operations;
- eliminates the use of overhead crossbeams and provisional installation of pieces to be locally adjusted, or that require disassembly on future occasions to allow the passage of equipment, pieces and parts of structures, machinery, etc.;
- maximizes the space available for the circulation of vehicles and personnel; by minimizing the number of structural interfaces between the pipeline support means and the tunnel walls, thereby reducing the possibility of errors from occurring, as well as the need for local adjustments;
- reduces the overall number of parts to be transported into the tunnel, and additionally reduces transportation costs in view of the fact that the overall weight of parts used in the pipeline support means of the invention are substantially lower than the weight of the pipeline support means currently used;
- drastically reduces the assembling time for installing the pipeline support means;
- avoids traction stresses from occurring in the tunnel walls, in view of its constructive design which causes the stresses to remain within the structure itself;
- eliminates the use of heavy concrete plinths (bases) to bear all the pipeline support elements, thereby simplifying the installation of the whole pipeline support means.

These and other features of the invention will be more apparent from the following description of the invention and the drawings.

BRIEF DESCRIPTION OF THE DRAWINGS

FIG. 4 is a schematic side view in perspective partially depicting the interior of a tunnel and showing elongated curved support structures according to the present invention.

FIGS. 5A and 5B depict perspective views showing details of a pipeline support element according to the present invention.

FIG. 6 is a schematic side view in perspective partially depicting the interior of a tunnel and showing a elongated curved support structure with a pipeline support element fixed thereto.

FIG. 10 is a schematic side view in perspective partially depicting the interior of a tunnel and showing elongated curved support structures with pipeline support elements fixed thereto, one of them supporting a segment of pipeline.

FIGS. 11, 11A and 11B depict a modularized elongated curved support structure comprising first lower segment and a second upper segment.

FIG. 15 is a schematic side view in perspective depicting details of the back of the short curved support structure depicted in FIGS. 12, 13 and 14.

FIG. 16 is a schematic side view depicting the short curved support structure depicted in FIG. 15 with a motorized pipeline support element fixed thereto and supporting a segment of pipeline.

FIG. 17 is a schematic side view in perspective partially depicting the interior of a tunnel and showing the short curved support structure with a motorized pipeline support element with a support element fixed thereto.

FIG. 18 depicts the motorized pipeline support element with a support element fixed thereto of FIG. 17 with a segment of pipeline being supported.

DETAILED DESCRIPTION OF PREFERRED EMBODIMENTS OF THE INVENTION

Before describing a detailed description of the invention, some comments will be made regarding FIGS. 22, 22A, 23 and 24, showing pipeline support systems according to the prior art.

Figure 22:
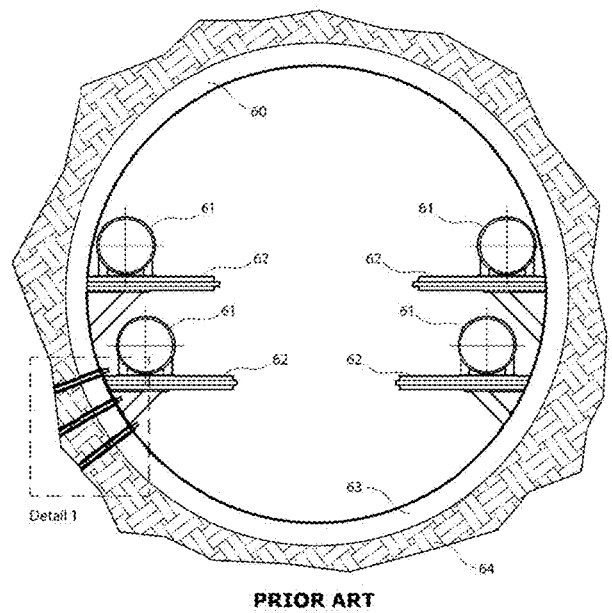
FIG. 22 is a schematic front view depicting a cross section of a tunnel provided with pipeline support elements of the prior art directly fixed to the walls.

FIG. 22 is a schematic front view showing a cross section of a tunnel 60 excavated by the TBM method and provided with a plurality of pipeline support elements 62 which serve as support for a plurality of pipelines 61. It should also be seen in the Figure the walls 63 of the tunnel 60 encircled by a layer 64 of the soil layer that has been excavated for the construction of the tunnel.

Figure 22A:
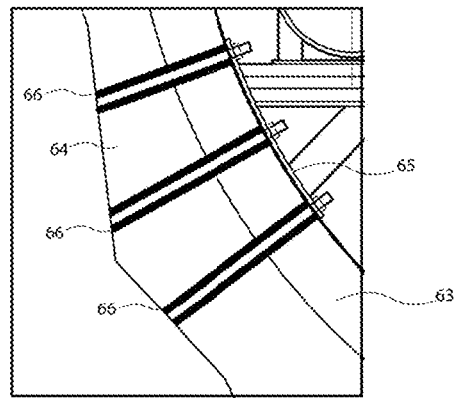
FIG. 22A depicts a detail of FIG. 23.

The pipeline support elements 62 are fixed to support plates 65 which can be seen in FIG. 22A, showing the detail A highlighted in FIG. 22.

In order to fix the brackets 65 to the walls 63 of the tunnel 60 it is necessary to perforate the walls for the passage of fixing elements 66. It is important to note that the fasteners 66 that lie on the tops of the support plates 65 cause traction stresses in the walls 63 due to angular momentum formed in these fastening elements 66, whereas the fastening elements 66 which are located at the bottoms of support plates 65 cause compressive forces on the walls 63.

Since the walls of tunnels excavated by the TBM method should not withstand traction stresses, it is necessary to proceed with drilling for a substantial length beyond the thickness of wall 63, coming from the layer 64, so as to provide a firm anchorage for these fixing elements.

This can be seen in greater detail in FIG. 22A.

As already commented above, the need to make such perforations causes many problems, starting from the difficulty of getting into the interior of a small tunnel and to operate a deep drilling machine, having significant dimensions and substantially high weight.

As was also mentioned above, another disadvantage is that, when drilling the tunnel walls, the characteristics of sealing and impermeability of the tunnel is compromised, which may facilitate the entry of water into the tunnel through the perforations made for the fixing elements 66, if they are made in regions of the tunnel that cross aquifers.

Therefore, the technique depicted in FIG. 22 has many drawbacks and risks for the installation of a pipeline support system in the interior of a tunnel excavated by the TBM method.

Figure 23:
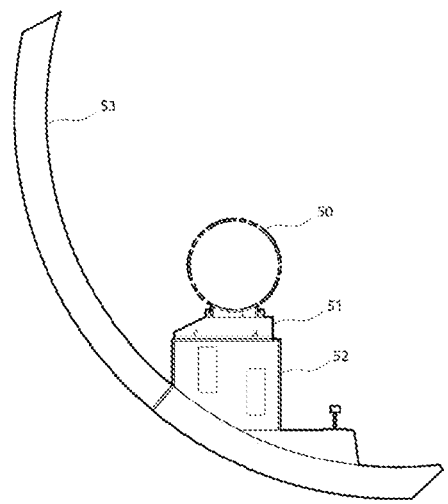
FIG. 23 is a schematic front view depicting a pipeline support element of the prior art made of concrete.

FIG. 23 is a schematic front view showing a wall segment 53 of a tunnel excavated by the TBM method. A concrete block 52 (concrete plinth) can be observed fixed to the bottom of the tunnel which serves to support a fixing element 51 for a pipeline 50.

This method of support of pipelines is widely used for pipelines that extend along the ground, but is not very suitable for use inside tunnels due to the fact that it causes problems.

Cited among these problems may be the difficulty for transport due to its high unit weight, the characteristic of occupying a lot of space which hinders the movement of personnel and equipment, and by not providing facilities for the installation of new pipelines in the tunnel.

Thus, the technique depicted in FIG. 23 does not present itself as being attractive for the installation of a pipeline support system in a tunnel excavated by the TBM method.

Figure 24:
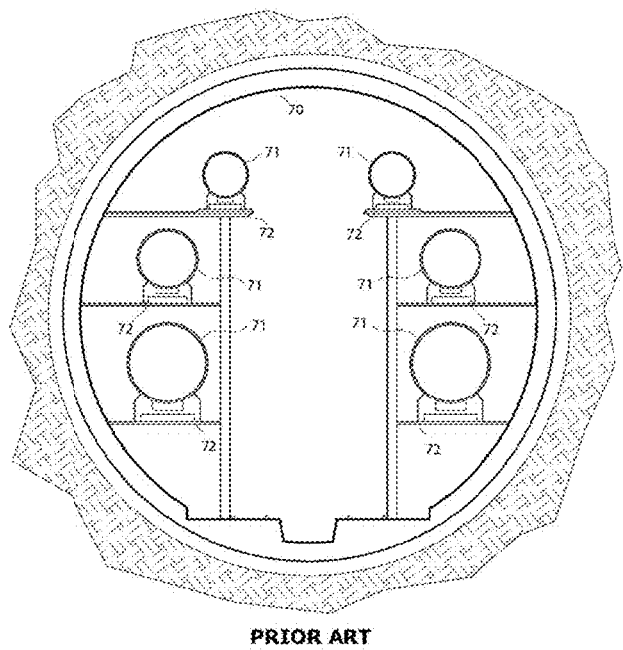
FIG. 24 is a schematic front view depicting a cross section of a tunnel provided with support structures of the prior art, comprising metallic columns and beams.

FIG. 24 is a schematic front view showing a cross section of a tunnel excavated by the TBM method in which a plurality of pipes 71 can be seen, supported by fixing elements 72. A hyperstatic structure 73 can also be observed comprising metal columns and beams.

This type of pipeline support system can be used without problems in tunnels excavated by the conventional methods previously mentioned, but has a number of disadvantages if used in tunnels having substantially concave inner walls such as those excavated by the TBM method.

Since these tunnels usually have circular, elliptical or egg-shaped cross sections, wherein there is not a floor, or only a floor of small transverse dimension may be provided, this complicates the use of the inner space in the case of using a hyperstatic structure to support pipeline support elements. Because these hyperstatic structures are formed by a tangle of columns and straight beams, it prevents them from being faced with the tunnel walls. Consequently, there is no way to properly take advantage of the inner space, in special in the middle region of the tunnel.

Since the columns are straight, and it is necessary to provide for the possibility of installing new pipelines, it is necessary for the hyperstatic structures to be designed and installed anticipating this possibility. Hence, there is a tendency for hyperstatic structures to be installed as shown in FIG. 24.

It can be seen from the Figure that in this situation, the lower region of the walls of the tunnel cannot be exploited for the passage of pipelines, or, at most, may only be utilized for the passage of fine diameter pipelines, which is usually not economically feasible.

In case a pipeline of higher diameter is to be installed in a tunnel provided with such hyperstatic structures, the feature of not being possible to install it closer to the walls of the tunnel would reduce the central space of the small floor that is built in the lower region of these tunnels, to enable the passage of personnel and equipment.

This can be clearly seen in FIG. 24.

This makes difficult the use of hyperstatic structures for pipeline support in tunnels having inner walls substantially concave, such as tunnels excavated by the TBM method, as it would hinder the movement of personnel and equipment in the performance of regular inspection and maintenance, for example.

Another problem for the installation of these hyperstatic structures is that the metal columns and beams are heavy, and must be transported into the tunnel interior for the assembly and installation of the hyperstatic structures, with said operation requiring the use of heavy equipment.

In addition, it is also necessary to have the availability of space for workers to prepare the beams and columns inside the tunnel. However, in tunnels excavated by the TBM method, especially in smaller tunnels usually excavated for the passage of pipelines, there is no such availability of space.

It is therefore evident that this pipeline support system by means of hyperstatic structures depicted in FIG. 24 is unsuitable to be used for the support of pipelines in a tunnel having substantially concave inner walls such as those excavated by the TBM method.

Thus, in view of what has been described above, it is evident that none of these conventional pipeline support systems depicted in FIGS. 22, 23 and 24 is suitable to be used in the support of pipelines in tunnels having substantially concave inner walls, in special those excavated by the TBM method, since all of the conventional methods have major drawbacks.

A possible solution for the abovementioned problems would be to increase the transverse dimensions of the excavated tunnel, but this would dramatically increase costs and time for excavating the tunnel.

As will be noted in the description of the invention which follows, the present invention solves all the problems mentioned above, in addition to providing great flexibility and economy for the installation of pipeline support systems in tunnels having substantially concave inner walls, in special those excavated by the TBM method.

Figure 1:
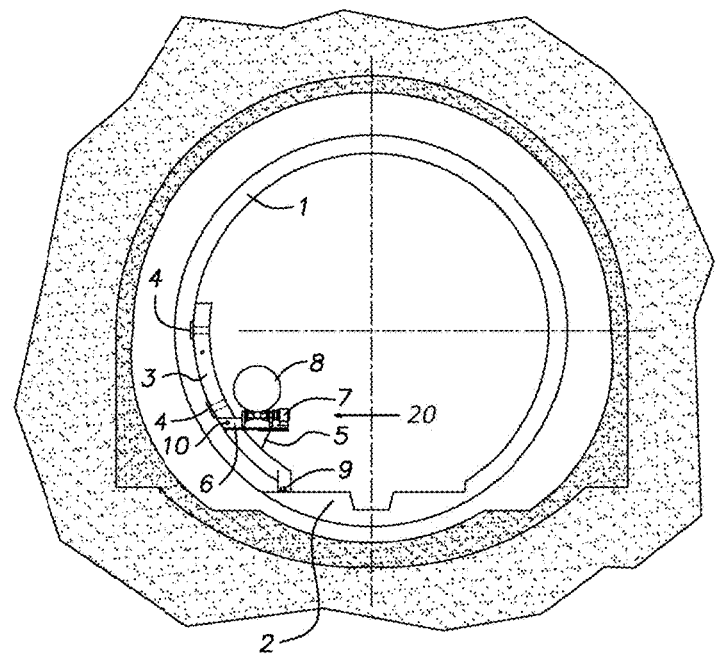
FIG. 1 is a schematic front view depicting a cross section of a tunnel having a pipeline passing through it and supported by a pipeline support element fixed to a elongated curved support structure according to the present invention.

FIG. 1 comprises a schematic front view depicting a cross section of a tunnel provided with a inner wall 1 and a floor 2 and having a pipeline 8 passing through it. It can be observed an elongated curved support structure 3, according to the present invention, comprising a body having a concave back surface which is fixed to the tunnel inner wall 1 and to the tunnel floor 2 by means of a suitable fixing system.

In the embodiment depicted in FIG. 1, and for exemplification only, the fixing system comprise at least one wall fastening element 4 which pass through clearance holes (not shown in the Figure) in order to fix the elongated curved support structure 3 to the inner wall 1, and at least one floor fastening element 9 which also pass through clearance holes (not shown in the Figure) in order to fix the elongated curved support structure 3 to the floor 2.

It is important to mention that other kind of fixing systems may be used to fix the elongated curved support structure 3 to the inner wall 1 and the floor 2 of the tunnel.

The back surface of the body of the elongated curved support structure 3 is substantially concave so as to contact the tunnel inner wall 1 along its whole length with the exception of its lower part which contacts the tunnel floor 2. In other words, the curvature of the back surface of the elongated curved support structure 3 substantially follows the geometrical contour of the region of the tunnel inner wall 1 where they contact, with the exception of its lower part, which contacts the floor 2.

It must be mentioned that it is possible to have an elongated curved support structure which is only fixed to the tunnel inner wall 1, not having a lower part fixed to the tunnel floor 2.

Both the tunnel inner wall 1 and the tunnel floor 2 are provided with connecting elements to receive and connect wall fastening elements 4 and floor fastening elements 9 that serve to secure the elongated curved support structure 3 to the tunnel inner wall 1 and tunnel floor 9, respectively.

Positioning pins may be used in the elongated curved support structure 3 to couple to receiving holes, or vice-versa, in order to facilitate the operation required to set the elongated curved support structure 3 in the installing position.

A pipeline supporting device 20 is connected to the elongated curved support structure 3. In this embodiment it comprises at least one connecting element 6, at least one securing element 10, a pipeline support means 5 and a pipeline support element 7.

The pipeline support means 5 is connected to said at least one connecting element 6, and the latter is firmly secured to the elongated curved support structure 3 by means of said at least one securing element 10, which can comprise, for exemplification only, a screw and a nut. The pipeline support element 7 is connected to the upper part of the pipeline support means 5. In FIG. 1 it is depicted a motorized pipeline support element, for the sake of illustration only.

Figure 2:
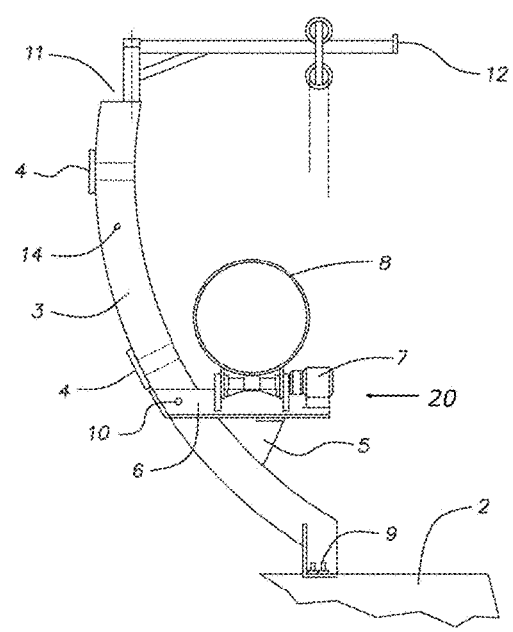
FIG. 2 is a schematic side view depicting details of a pipeline supporting device fixed to a elongated curved support structure according to the present invention.

FIG. 2 is a schematic side view depicting details of the pipeline supporting device 20 wherein it is connected to a elongated curved support structure 3 by means of the connecting element 6.

Figure 2A:
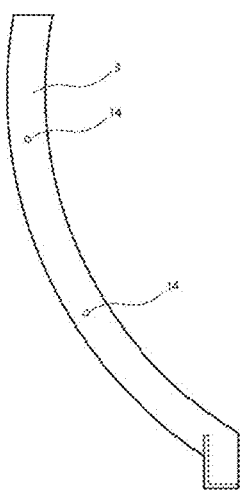
FIG. 2A is a schematic perspective view depicting details of a elongated curved support structure according to the present invention.

FIG. 2A depicts a schematic side view of the elongated curved support structure 3 and showing a pair of connecting holes 14 which serve to allow the connection of the supporting device 20 to the elongated curved support structure 3 by the securing elements 10, in order to firmly secure the connecting element 6 to the elongated curved support structure 3.

The number of connecting holes 14 in the elongated curved support structure 3 is not limited to two, and will be determined according to the requirements of the project.

In the embodiment shown in FIG. 2, for exemplification only, a securing element 10 that passes through a connecting hole 14 firmly connects the connecting element 6 to the elongated curved support structure 3. This connecting hole 14 is not shown in the Figure because it is covered by the connecting element 6.

The connecting hole 14 which appears in the upper part of the elongated curved support structure 3 could be used for future installation of an additional assembly formed by a connecting element 6, a pipeline support means 5 and a pipeline support element 7, in order to support another pipeline. In this case, this assembly would be secured to the elongated curved support structure 3 by means of another securing element 10 passing through this connecting hole 14.

Also observed in FIG. 2 is a removable cargo boom 12, which rests in the upper part 11 of the elongated curved support structure 3 in order to assist the installation of a following curved support structure.

It is important to mention that the use of the pipeline supporting device 20 connected to the elongated curved support structure 3 by securing elements 10 passing through the connecting holes 14 is just a possible possibility to provide a pipeline supporting device to the elongated curved support structure 3, and so the description made heretofore with regard the pipeline supporting device 20 was made for exemplification only.

Figure 3:
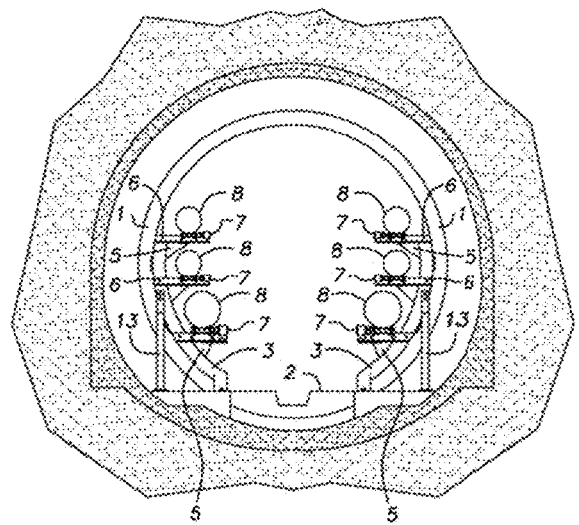
FIG. 3 is a schematic view depicting a cross section of a tunnel having three pipelines passing through it and supported by pipeline support elements fixed to a elongated curved support structure according to the present invention.

FIG. 3 is a schematic front view of a tunnel having a plurality of pipelines 8 being supported by pipeline support means 5 securely connected to an elongated curved support structure 3 by connecting elements 6 according to the present invention.

The pipelines 8 are installed passing close to the wall 1, in both sides of the tunnel, thereby maximizing the space in the central part of the tunnel so as to facilitate the movement of equipment and personnel for maintenance and inspection operations FIG. 4 is a schematic side view in perspective partially depicting the interior of a segment of tunnel and showing curved support structures according to the present invention wherein the tunnel is provided with a first segment of smaller diameter having a first wall 1' and a first floor 2' which is abruptly followed by a second segment of larger diameter having a second wall 1 a second floor 2.

Fastening elements 4 firmly secure a first elongated curved support structure 3' to the first wall 1', and the lower end of the elongated curved support structure 3' is secured to the first floor 2' as previously described heretofore, by means of floor fastening elements not shown in FIG. 4.

A second elongated curved support structure 3 is installed in the second segment of larger diameter of the tunnel.

As the curved support structures according to the present invention are designed to rest in the walls of a tunnel, if the second elongated curved support structure 3 is installed resting in the second wall 1, that has a larger diameter, it will not be in alignment with the first elongated curved support structure 3', that rests in the wall 1' of the first part of smaller diameter. Accordingly, this misalignment would cause problems to install a pipeline in the tunnel.

In order to address this problem, the present invention provides buttress elements 13 which are firmly secured to the second elongated curved support structure 3, as shown in FIG. 4. In addition, a plinth element 22 is also provided, resting in the second floor 2 of the second part of the tunnel with larger diameter and serving to compensate for unevenness of first and second floors 2' and 2.

In case the first and second floors 2' and 2 are substantially at the same level, e.g., when the first and second segments of the tunnel are nor concentric or have different shapes of cross sections (circular and elliptical, for example), the plinth element 22 may not be necessary to install the second elongated curved support structure 3 accordingly.

Connecting elements not shown in FIG. 4 provide a firm connection of the buttress elements 13 to the second elongated curved support structure 3 and to the plinth element 22 (or to the second floor 2, in case a plinth element 22 is not used).

Although in FIG. 4 the second elongated curved support structure 3 is provided with two buttress elements 13, one at each side, it is possible to use a plurality of them. For example, it is possible to use buttress elements of different heights connected at different levels of the elongated curved support structure 3 so as to provide a balanced reinforcement.

The combination of the use of the buttress elements 13 and the plinth element 22 to support the elongated curved support structure 3 allows to compensate for the misalignment between the first elongated curved support structure 3' and the second elongated curved support structure 3, whereby installation of a pipeline into the tunnel can be made accordingly.

FIGS. 5A and 5B depict perspective views of an embodiment of a pipeline support means 5, which comprise segments of plates firmly secured to each other so as to enable the pipeline support means 5 to be firmly secured to a curved support structure. Assembling holes 16 are provided to allow firm assemblage of a pipeline support element atop of the pipeline support means 5.

An opening 15 provides access to a fixation hole 26 when it is necessary to connect the pipeline support means 5 to a curved support structure.

FIG. 6 depicts a schematic side view in perspective partially depicting the interior of a tunnel and showing a pipeline support means 5 as depicted in FIGS. 5A and 5B firmly connected to an elongated curved support structure 3 according to the present invention.

Figure 7:
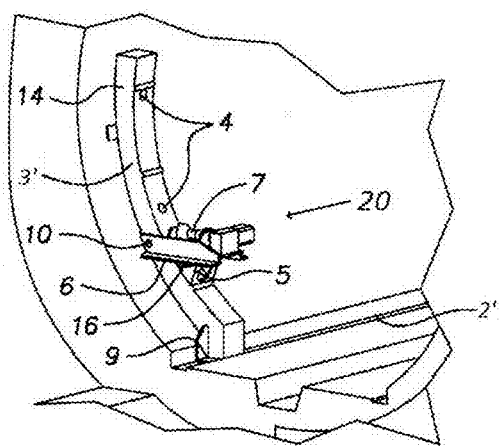
FIG. 7 depicts the curved support structure of FIG. 6 with a pipeline support element fixed thereto, wherein a motorized pipe support roller is fixed to the pipeline support element.

FIG. 7 depicts the support means 5 of the pipeline supporting device 20 connected to the elongated curved support structure 3 by the connecting element 6 and the securing elements 10 wherein a pipeline support element 7 is fixed to the support means 5.

Figure 8:
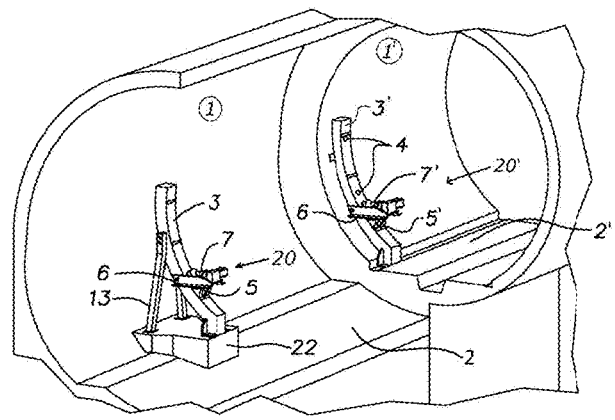
FIG. 8 is a perspective view depicting the elongated curved support structures of FIG. 4 with pipeline support elements fixed thereto, wherein motorized pipe support rollers are fixed to the pipeline support elements.

FIG. 8 depicts the first and second curved support structures 3' and 3 shown in FIG. 4 provided with first and second pipeline supporting devices 20' and 20 having first and second support means 5' and 5 (as shown in FIGS. 5A and 5B) fixed to them, wherein pipeline support elements 7' and 7 are fixed to said support means 5.

Figure 9:
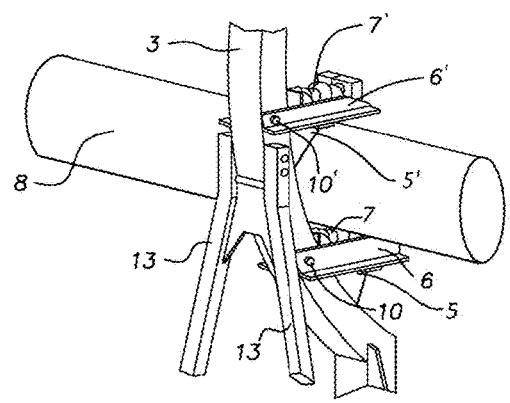
FIG. 9 is a schematic side view in perspective depicting details of the back of a elongated curved support structure with two pipeline support elements fixed thereto and supporting a segment of pipeline.

FIG. 9 is a schematic side view in perspective depicting details of the back of an elongated curved support structure 3 with buttress elements 13 connected thereto. Two pipeline support means 5 and 5' are firmly fixed to the elongated curved support structure 3, both having pipeline support elements 7 and 7' fixed to them, respectively. A segment of a pipeline 8 rests on the pipeline support element 7 of the pipeline support means 5.

It is important to mention that it is possible to connect more than two pipeline supporting devices to an elongated curved support structure, depending on the dimensions of the pipelines to be supported.

For example, FIG. 10 depicts a situation where the first and second curved support structures 3' and 3 shown in FIG.

8 are each provided with three pipeline supporting devices. A pipeline 8 is depicted supported by one of these pipeline supporting devices.

Figure 11:
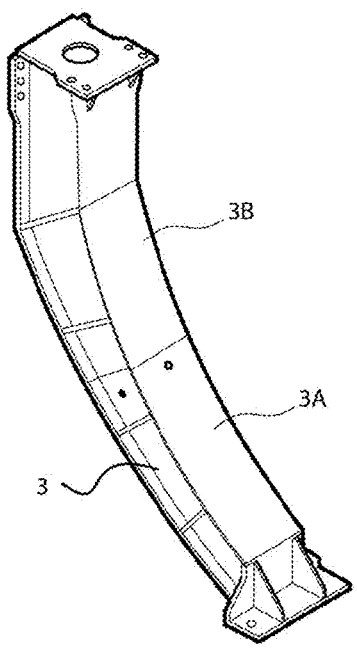

The elongated curved support structures may be installed in stages. FIGS. 11, 11A and 11B depict a modularized elongated curved support structure 33 wherein it comprises a first lower segment 33A (FIG. 11A) and a second upper segment 33B (FIG. 11B). In the case where only one pipeline is laid in a tunnel, for example, it is possible to initially install only lower segments 33A of the of modularized elongated curved support structures 33 in the tunnel.

If it is necessary in the future to lay other pipelines in the tunnel, then upper segments 33B must be connected to the already installed lower segments of curved support structures and to the tunnel wall (by means of fixing elements 4). It will then be possible to connect to these upper segments the necessary arrangements of pipeline support means and pipeline support elements needed to support the new pipeline.

Figure 12:
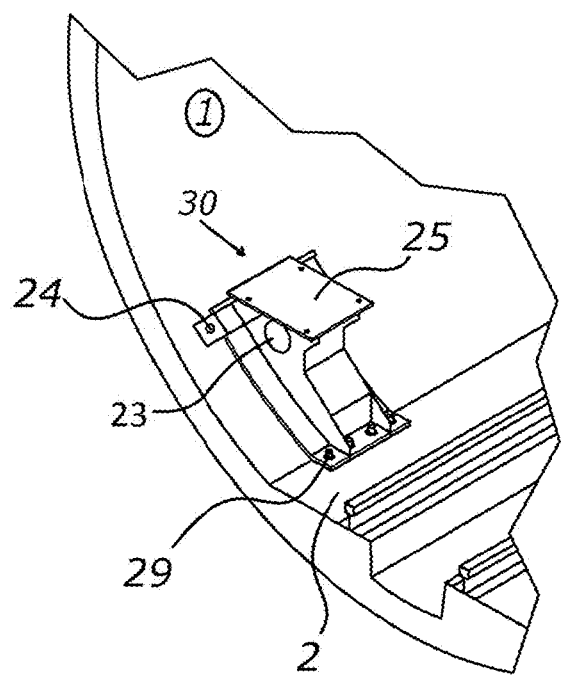
FIG. 12 is a schematic side view in perspective partially depicting the interior of a tunnel and showing a second embodiment of a short curved support structure according to the present invention.

FIG. 12 is a schematic side view in perspective depicting a second embodiment of the invention comprising a short curved support structure 23 firmly connected to the tunnel inner wall 1 and to the tunnel floor 2 by a fixing system comprising at least one wall fastening element 24 which pass through clearance holes (not shown in the Figure) in order to fix the elongated curved support structure 23 to the inner wall 1, and at least one floor fastening element 29 which also pass through clearance holes (not shown in the Figure) in order to fix the elongated curved support structure 23 to the floor 2.

The short curved support structure 23 was designed by following the same design principles as in the curved support structures described heretofore with respect to FIGS. 1-11, namely, the curvature of its back part is substantially the same as the curvature of the region of the tunnel wall where they contact, usually of circular shape.

Figure 13:
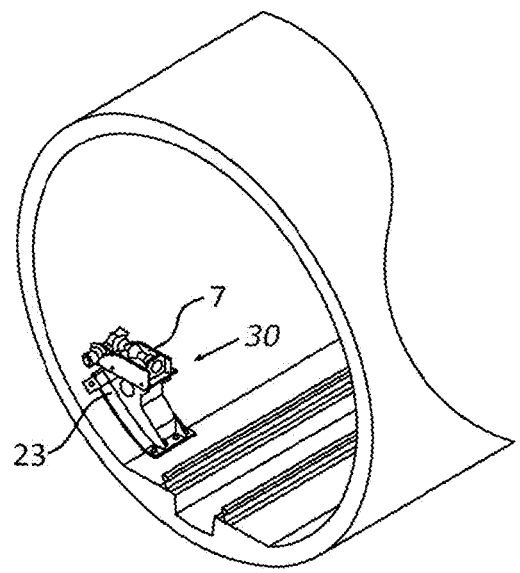
FIG. 13 is a schematic side view in perspective partially depicting the interior of a tunnel and showing the short curved support structure of the FIG. 12 with a motorized pipeline support element fixed thereto.

In this embodiment a pipeline support device 30 is provided, comprising a pipeline support rest 25 placed atop the short curved support structure 23, serving to receive a pipeline support element 7 firmly fixed onto it, as depicted in FIG. 13. The pipeline support element 7 shown in the Figure is a motorized pipeline support element, for the sake of exemplification only.

Figure 14:
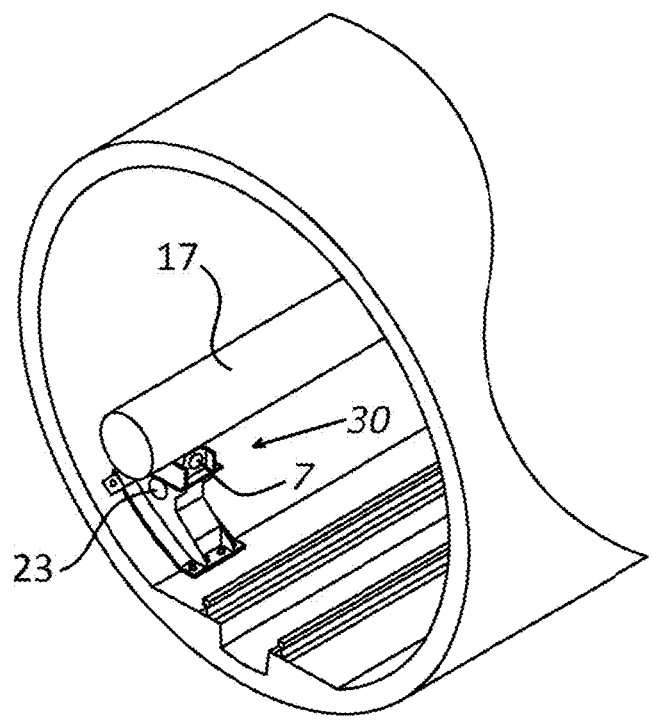
FIG. 14 is a schematic side view in perspective partially depicting the interior of a tunnel and showing the short curved support structure of the FIG. 13 with a motorized pipeline support element fixed thereto, and supporting a pipeline.

FIG. 14 depicts a segment of pipeline 17 resting on a pipeline support element 7 fixed to the pipeline support device 30 connected to the short curved support structure 23.

FIG. 15 is a schematic side view in perspective depicting details of the back of the short curved support structure 23 depicted in FIGS. 12, 13 and 14.

FIG. 16 is a schematic side view depicting the short curved support structure 23 shown in FIG. 15 with a motorized pipeline support element fixed thereto and supporting a segment of pipeline 17.

Figure 19:
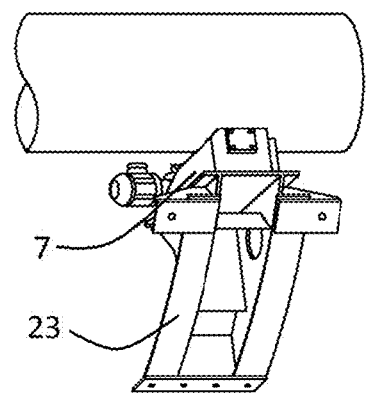
FIG. 19 is a schematic side view in perspective depicting details of the back of said short curved support structure with a motorized pipeline support element fixed thereto and supporting a segment of pipeline.

FIGS. 17, 18 and 19 depict a different type of motorized pipeline support element 7 fixed to the pipeline support device 30 of the short curved support structure 23.

The short curved support structures 23 were developed mainly for the installation of pipelines requiring support near the floor of the tunnel, although it is possible to connect an upper extension to it, which must also be firmly secured to the tunnel wall, and then to connect pipeline support means to this upper extension.

Figure 20:
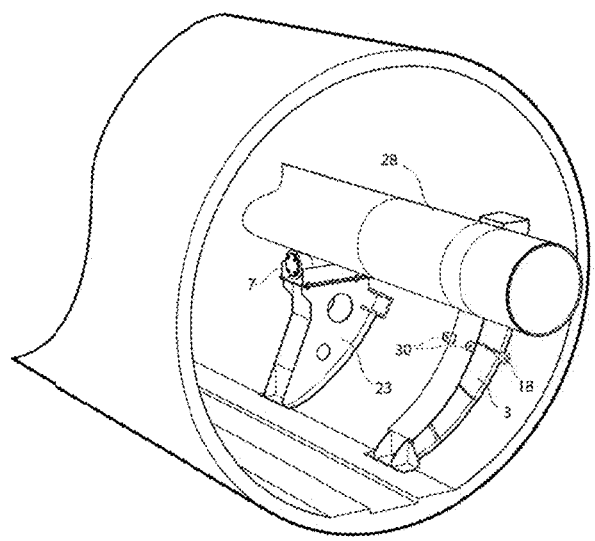
FIG. 20 is a schematic view in perspective depicting a combined use of the two short and elongated curved support structures of the invention.

FIG. 20 shows a combined use of the two embodiments of the invention described above. A short curved support structure 23 can be observed affixed to the wall of a tunnel and provided with a pipeline support element 7 which supports a pipeline segment 28.

An elongated curved support structure 3 is positioned to be installed, and will serve to provide a support means for additional pipelines to be launched in the tunnel. To facilitate the installation maneuvers, the elongated curved support structure 3 is provided with eyebolt lifting 30.

The installation operation of the elongated curved support structure 3 needs to pass behind the pipeline segment 28, until reaching the correct position of installation, which will then be properly affixed to the wall of the tunnel. Maneuvering rollers 18 may be attached to the elongated curved support structure 3 to facilitate the installation operation, as depicted in FIG. 20.

By using these rollers the maneuvers needed to make the curved support structure 3 pass behind the already installed pipeline 28 are extremely facilitated, whereby the installation is safer and faster.

After the installation of the elongated curved support structure 3 is completed, the other components that will provide support for a pipeline can be then installed.

By the foregoing description of the invention it is clear that the inventive concept that enabled the development of the invention resides in the provision of curved support structures whose back part has substantially the same curvature as the curvature of the region of the tunnel inner wall where they both contact. Hence, said curved support structures substantially superpose the tunnel wall along its whole length. Additionally its lower part may superpose and connect to the tunnel floor.

Figure 21:
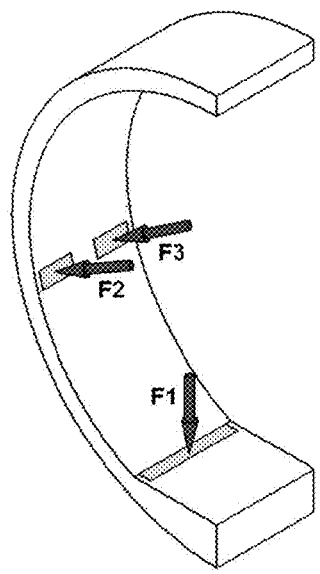
FIG. 21 is a schematic view of a side segment of the wall of a tunnel showing arrows which schematically represent the compression stresses resulting from the action of the use of the curved support structures of the present invention when bearing the weight of a pipeline.

Consequently, the stresses in the tunnel wall caused by the action of the weight of the pipelines supported by the support means of the curved support structures are essentially compression stresses, as is schematically shown in FIG. 21, wherein the arrows F1, F2 and F3 show the compression exerted by the curved support structure against the tunnel wall.

The invention was described herein with respect to some preferred embodiments, but is not limited to them, since modifications and/or substitution of parts can be made without departing from its inventive concept.

For example, the curved support structure 23 may form a unitary assembly with the pipeline support element 7, in which case there is no need to use fastening means to connect them. This arrangement is preferably used when the floor and the walls of the tunnel are evenly leveled.

Further, a sloping structure can be connected atop the support structure 23 with a pipeline support element 7 connected atop of it. The purpose of such an arrangement is to provide the means to correct misalignments which may occur during the installation, or even when the pipeline is in operation.

Although the invention has been described as being used to provide support means for pipelines, it is not limited to such use, as it can be used, for exemplification only, to provide support means to electrical, optical or any kind of cable in tunnels having at least one generally concave inner wall.

Moreover, although the Figures depicting the invention show pipeline support elements comprising pipeline supporting rollers, it is important to mention that these pipeline support elements are not part of the invention and so they were shown in the Figures for exemplification purposes only, as any type of pipeline support element can be used.

The above explanation, notwithstanding its broadness, does not exclude other modalities that might eventually derive from the present invention, either in terms of a differentiating constructive model or in terms of novel characteristics that may be contemplated as a consequence of the development in actual practice of the present invention. Therefore the present invention should not be deemed limited to the topics described herein.

The invention claimed is:

1. A curved support structure to support pipelines in a tunnel having at least one generally concave inner wall and a planar floor, the curved support structure comprising:
    a body comprising a concave back surface that is configured to contact and substantially follow the geometrical contour of said generally concave inner wall in a region where the curved support structure is fixed thereto;
    at least one wall fastening element which passes through a first clearance hole that extends through the concave back surface of the body and configured to fix the curved support structure to said generally concave inner wall;
    a planar floor support comprising a block or plate that is integral with the body and comprising a planar bottom surface that is angled with respect to the concave back surface of the body, the planar bottom surface configured to contact and substantially follow the geometrical contour of said planar floor in a region where the curved support structure is fixed thereto;
    at least one floor fastening element which passes through a second clearance hole that extends through the planar bottom surface of the planar floor support and configured to fix the curved support structure to said planar floor of said tunnel,
    wherein the planar floor support is positioned on the body at a location that is configured to correspond to an interface of said generally concave inner wall and planar floor and so that, in an installed condition within said tunnel, the curved support structure is vertically supported by both of said generally concave inner wall and planar floor; and
    at least one pipeline support device connected to and supported by the body of the curved support structure and configured to support said pipelines at a location adjacent said generally concave inner wall and laterally offset from a centerline bisecting said tunnel.

2. The curved support structure of claim 1, wherein the body of the curved support structure further comprises at least one connecting hole.

3. The curved support structure of claim 2, wherein said at least one pipeline support device comprises:
    a pipeline support means;
    a pipeline support element connected to the pipeline support means;
    at least one connecting element; and
    at least one securing element connecting said at least one connecting element to said at least one connecting hole of the curved support structure.

4. The curved support structure of claim 3, wherein maneuvering rollers are attached to the curved support structure.

5. The curved support structure of claim 1, wherein said body is modularized and comprises a first lower segment and a second upper segment which can be connected to each other.

6. The curved support structure of claim 5, wherein the body of the curved support structure further comprises at least one connecting hole.

7. The curved support structure of claim 6, wherein said at least one pipeline support device comprises:
    a pipeline support means;
    a pipeline support element connected to the pipeline support means;
    at least one connecting element; and
    at least one securing element connecting said at least one connecting element to said at least one connecting hole of the curved support structure.

8. The curved support structure of claim 7, wherein maneuvering rollers are attached to the curved support structure.

9. The pipeline supporting equipment of claim 8, further comprising a plinth element resting in said second planar floor to compensate for unevenness of first and second planar floors.

10. The curved support structure of claim 1, wherein said pipeline support device comprises a pipeline support rest placed atop the curved support structure, and wherein a pipeline support element is placed and secured onto the pipeline support rest.

11. The curved support structure of claim 10, wherein the body of the curved support structure is modularized and comprises a first lower segment and a second upper segment which can be connected each other.

12. A pipeline supporting equipment to support pipelines in a first segment of a tunnel having at least one generally concave first inner wall and a first planar floor, and a second segment of the tunnel having a second inner wall and a second planar floor, wherein a cross section of said second segment of the tunnel is larger than a cross section of said first segment, the pipeline supporting equipment comprising:
    a first curved support structure configured to be installed in said first segment of the tunnel, the first curved support structure comprising:
        a first body comprising a concave back surface that is configured to contact and substantially follow the geometrical contour of said generally concave first inner wall in a region where the first curved support structure is fixed thereto;
        at least one wall fastening element which passes through a first clearance hole that extends through the concave back surface of the first body and configured to fix the first curved support structure to said generally concave first inner wall;
        a planar floor support comprising a block or plate that is integral with the first body and comprising a planar bottom surface that is angled with respect to the concave back surface of the first body, the planar bottom surface configured to contact and substantially follow the geometrical contour of said first planar floor in a region where the first curved support structure is fixed thereto;
        at least one floor fastening element which passes through a second clearance hole that extends through the planar bottom surface of the planar floor support and configured to fix the first curved support structure to said first planar floor of said tunnel,
        wherein the planar floor support is positioned on the first body at a location that is configured to correspond to an interface of said generally concave first inner wall and first planar floor and so that, in an installed condition within said first segment of said tunnel, the first curved support structure is vertically supported by both of said generally concave first inner wall and first planar floor; and
        at least one pipeline support device connected to and supported by the first body of the first curved support structure and configured to support said pipelines at a location adjacent said generally concave first inner wall and laterally offset from a centerline bisecting said tunnel; and a second curved support structure configured to be installed in said second segment of the tunnel, the second curved support structure comprising a second body comprising a concave back surface and provided with at least one buttress element connected to the second body.

* * * * *

UNITED STATES PATENT AND TRADEMARK OFFICE
CERTIFICATE OF CORRECTION

PATENT NO. : 9,964,235 B2  
APPLICATION NO. : 15/208294  
DATED : May 8, 2018  
INVENTOR(S) : Gomes Fernandes Page 1 of 1

It is certified that error appears in the above-identified patent and that said Letters Patent is hereby corrected as shown below:

On the Title Page

Under item (*) Notice, Line 3, after "0 days." please delete "days.".

Under item (30) Foreign Application Priority Data, please delete "0904280" and insert therefor --PI0904280-6--.

Signed and Sealed this  
Twenty-fifth Day of September, 2018

Andrei Iancu  
*Director of the United States Patent and Trademark Office*